Feb. 21, 1928.

E. F. WESTON

MULTIPLIER

Filed Dec. 11, 1925

1,660,285

Inventor:
Edward F. Weston,
By Byrnes Townsend & Brickenstein
Attorneys.

Patented Feb. 21, 1928.

1,660,285

UNITED STATES PATENT OFFICE.

EDWARD F. WESTON, OF NEWARK, NEW JERSEY, ASSIGNOR TO WESTON ELECTRICAL INSTRUMENT CORPORATION, OF NEWARK, NEW JERSEY, A CORPORATION OF NEW JERSEY.

MULTIPLIER.

Application filed December 11, 1925. Serial No. 74,881.

This invention relates to electrical measuring instruments and more particularly to instruments for use in connection with radio receiving sets.

The general object of this invention is an instrument of the character referred to, which is applicable to a variety of uses.

A more specific object of the invention is the combination with an instrument designed for the measurement of relatively small potential differences, of a multiplier for extending the measuring range of the instrument.

In its most specific aspect, the invention has for its object a separate multiplier device which is normally detached from the instrument and can be readily attached thereto for the purpose mentioned.

Figure 1:
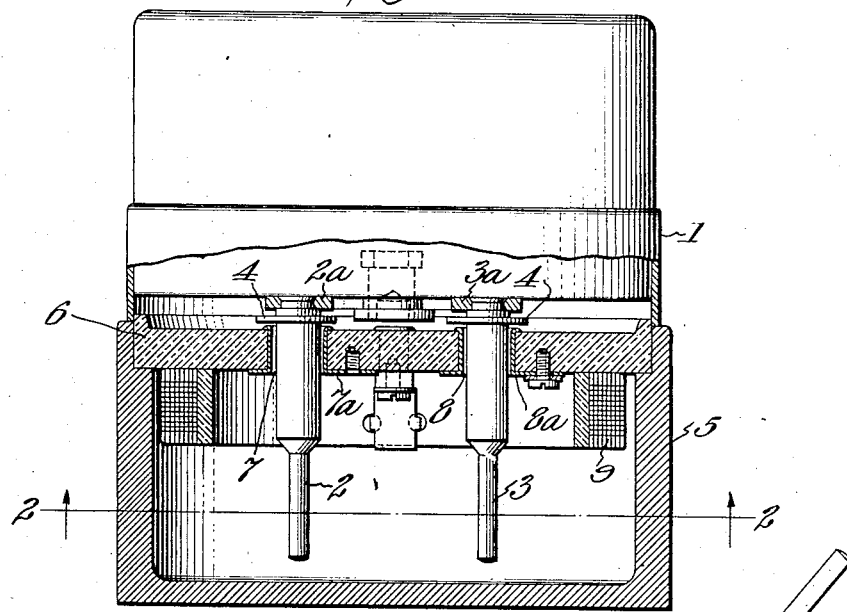
Figure 2:
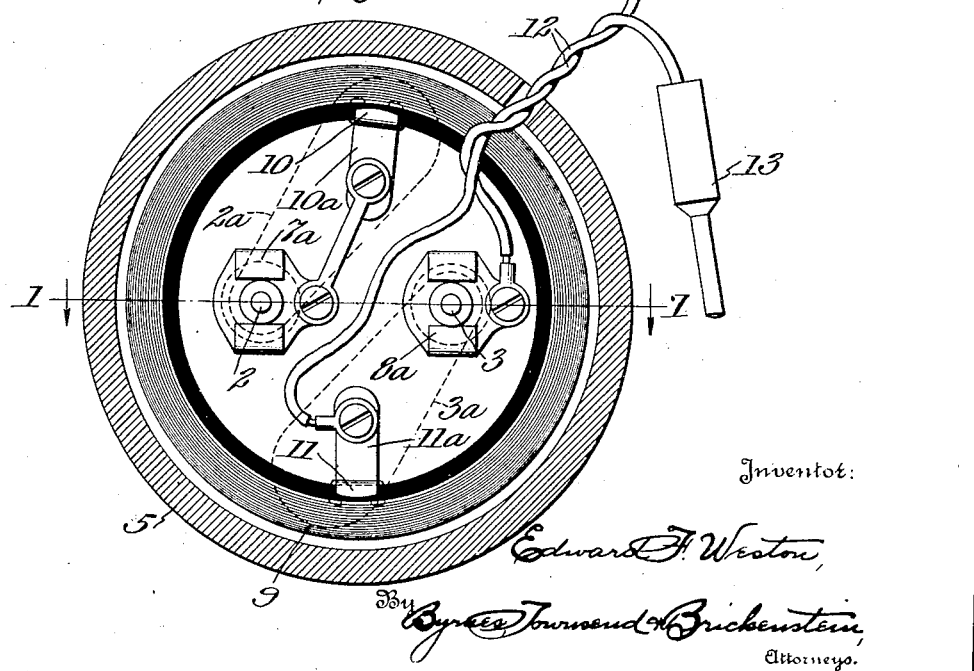

For a full understanding of the invention, reference is made to the accompanying drawings in which:

Fig. 1 is in part an elevation and in part a central section taken on the line 1—1 of Fig. 2, of a device embodying the invention; and Fig. 2 is a section taken on line 2—2 of Fig. 1.

In the drawings, the construction shown in Fig. 1 comprises in part an indicating instrument 1 shown and described in my Patent No. 1,630,592. This indicating instrument includes two pins or plugs 2 and 3 electrically connected with the electrical mechanism and defining terminals thereof. The electrical connections include angularly adjustable arms 2ª and 3ª on which the pins are mounted. The spacing of the pins thus may be readily varied within ordinary limits to readily enter differently spaced sockets connecting with two points of a circuit. In practice I make the pins detachable from the arms so that longer or shorter pins may be substituted to suit different conditions. I also preferably use washers 4 of insulating material to prevent the adjustable terminals from short-circuiting on the case or on each other.

The instrument so far described is intended for permanent use on a switch board or on a radio panel, in particular. However, in order to widen its field of application and make it useful for more than one particular use, I have provided a multiplier having sockets for receiving the pins 2 and 3.

The multiplier may be of any construction designed for one definite range of voltages or adjustable for different ranges. For the sake of example, the construction disclosed represents a form suitable for use in connection with a radio set. The indicating instrument represents a voltmeter for normally indicating the filament voltages. The multiplier is constructed to increase the measuring range so that the voltage of the B battery may be measured.

The particular form of the multiplier, which may be considered as a preferred embodiment, includes a shallow casing 5 of any suitable material and having a bottom wall which provides adequate support for the multiplier and an instrument carried thereby when the multiplier is placed upon a flat surface. A disk 6 of insulating material is connected to the casing to form a closure for the top thereof. The disk 6 contains openings 7 and 8 provided with spring jacks 7ª and 8ª of usual or any desired construction to make reliable electrical contact with the pins 2 and 3 when the latter are pushed into the openings 7 and 8. The sockets or contact receptacles defined by the openings 7 and 8 and the jacks 7ª and 8ª may in fact be precisely the same as the contact receptacles on the radio receiving set co-operating with the pins 2 and 3.

The resistance coil 9 is mounted on the disk 6 by means of cleats or clamps 10 and 11 which provide terminals 10ª and 11ª for the resistance coil 9. The terminal 10ª is shown as connected to the jack 7ª while the terminal 11ª is connected to one of the leads 12 carrying terminal pins 13, the other lead 12 connecting with the jack 8ª. The resistance is thus connected in the usual way in series with the instrument. The terminal pins may be received in a pair of sockets on the radio panel, leading to the poles of the B battery.

Normally, the voltmeter is attached to the panel and indicates the filament voltage. When it is desired to measure the voltage of the B battery, the voltmeter is pulled out from its sockets and placed into position on the multiplier, the latter forming a base for the instrument. The pins 13 are then inserted into the sockets which, as assumed, are provided for testing the B battery and the voltage can be readily read. After the test the instrument may be again detached and returned to its normal position.

By the simple arrangement described, a single voltmeter is sufficient for all voltage tests on a radio set. I have referred to application of the invention in connection with radio sets only because of the outstanding utility in that respect. It is emphasized the the invention is of broader application.

In fact, there is a great deal of latitude in respect to the interconnection of the multiplier and the indicating instrument by means of a plug and contact receptacle connection, the sole requisite being an arrangement whereby the indicating instrument may be withdrawn from the contact receptacles on a radio panel and plugged into the multiplier, the latter acting as a support for the instrument preferably so as to conveniently position the latter for reading.

I claim:

1. The combination with an electrical indicating instrument of the type having a plug terminal for cooperation with a contact receptacle, of a multiplier unit adapted to be placed in circuit with said instrument, said multiplier unit comprising a casing, a resistance, and a contact receptacle for receiving the said plug terminal.

2. The combination with an electrical indicating instrument of the type having two terminals for mechanically and electrically connecting said instrument to a pair of contact elements, of a multiplier unit comprising a casing, a resistance carried by said casing, and a pair of contact elements on said casing for cooperation with the said two terminals to connect said instrument to said case both mechanically and electrically.

3. An electrical indicating instrument multiplier, comprising a casing including a wall of insulating material, a resistance coil within the casing and a pair of contact receptacles for receiving plug terminals, said receptacles comprising openings through the said wall and spring jacks mounted in alignment with the openings within the casing, one of the spring jacks being connected with the resistance coil.

4. An electrical indicating instrument multiplier comprising a casing including a wall of insulating material, a resistance coil within the casing and a pair of contact receptacles for receiving plug terminals, said receptacles comprising openings through said wall and spring jacks mounted in alignment with the openings within the casing, a pair of conductors having terminal plugs, one of said conductors being connected to one of said jacks and the other to one end of the resistance coil, the other end of the resistance coil being connected to the other jack.

5. The combination with an electrical indicating instrument of the panel mounting type, of a supporting base having a bottom adapted to be placed upon a flat surface, a resistance within said base, a pair of contact terminals carried by said base for engagement with a circuit to be investigated, and a pair of contact elements on said casing for cooperation with the terminals of said instrument to connect said instrument to said supporting base both mechanically and electrically.

6. The combination with an electrical indicating instrument, of a multiplier unit providing a supporting base for said instrument, said instrument and said unit having cooperating electrical contacts in the form of pins and contact receptacles, said receptacles comprising means for frictionally engaging said pins to mechanically connect said instrument to said multiplier unit, whereby the instrument is mechanically supported by said multiplier unit as a base when the said pins are positioned within said sockets to effect the electrical connection of said instrument and said unit.

7. A multiplier for an electrical indicating instrument, said multiplier comprising a casing, a resistance in said casing, terminals carried by said casing for electrical contact with a circuit to be investigated, a contact receptacle on said casing for receiving a plug terminal of an indicating instrument, and electrical connections between said terminals, resistance and receptacle for placing an instrument in circuit across said terminals when the plug terminal of the instrument is inserted into said receptacle.

8. A base for an electrical indicating instrument of the type having a plug terminal, said base comprising a casing, a multiplier resistance in said casing, and a contact receptacle for receiving the plug terminal of said instrument, said contact receptacle providing a mechanical connection of said instrument to said base and electrical connection of said instrument in circuit with said resistance.

9. A base for an electrical indicating instrument of the type having a pair of plug terminals, said base comprising a multiplier resistance coil in said base, a pair of contact pins for contact with a circuit to be investigated, a pair of contact receptacles for receiving the plug terminals of an instrument, and circuit connections from said receptacles to said coil and contact pins, whereby the appropriate electrical connections to the instrument are established when the latter is mechanically connected to said base by inserting the plug terminals of the instrument into the said contact receptacles.

In testimony whereof, I affix my signature.

EDWARD F. WESTON.